United States Patent Office 3,039,325
Patented June 19, 1962

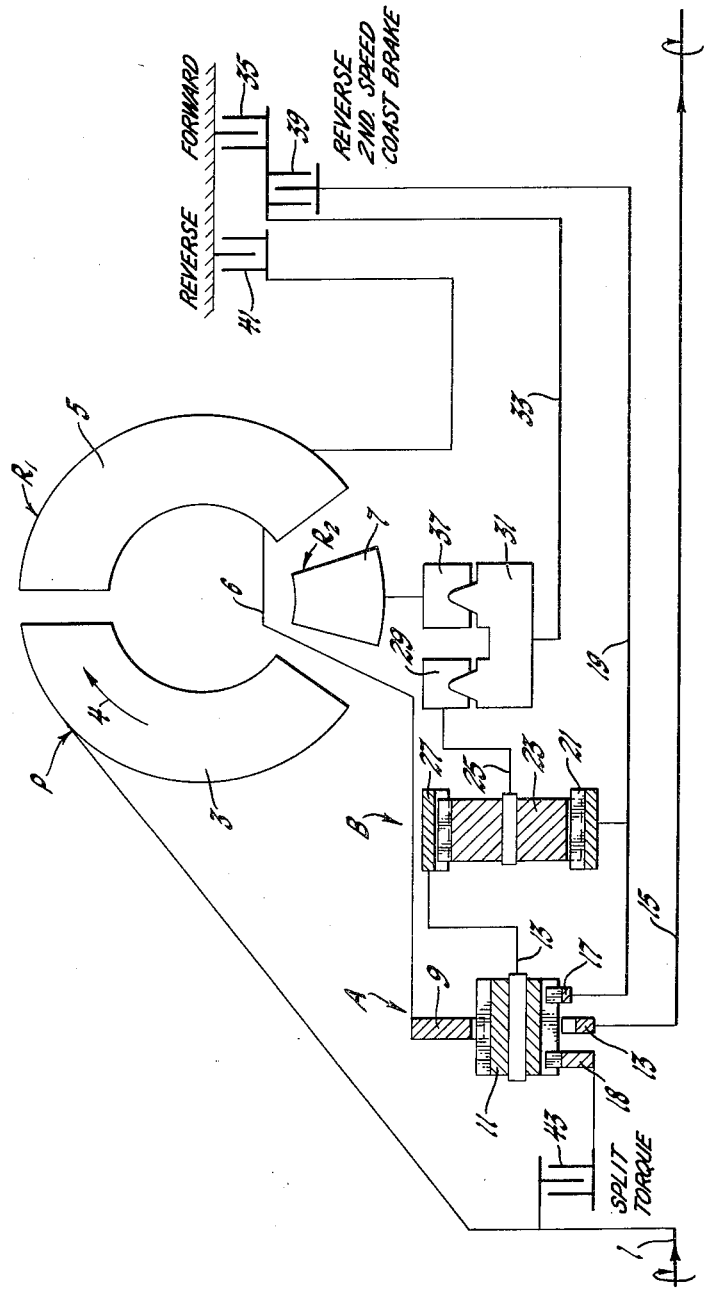

3,039,325
SPLIT TORQUE TRANSMISSION
Gilbert K. Hause, Bloomfield Hills, Mich., assignor to General Motors Corporation, Detroit, Mich., a corporation of Delaware
Filed Nov. 29, 1960, Ser. No. 72,499
4 Claims. (Cl. 74—677)

This invention relates to transmissions and more particularly to multi-speed automatic transmissions suitable for use in motor vehicles.

The advantages of hydrodynamic torque converters providing a limited range of infinitely variable torque multiplication in combination with fixed ratio planetary gearings are well known. It is also well known that in general the fewer components that go to make up the hydraulic torque converter and the gearing, the less expensive, the lighter, and the more efficient the transmission will be. While drive through the torque converter provides overall smoothness and infinitely variable torque ratio, these advantages are gained through some losses in fluid efficiency as well as losses in engine braking ability during vehicle coasting.

It is therefore an object of this invention to provide a combined hydraulic torque converter and gearing transmission which will provide the smoothness and gradual ratio change advantages of the torque converter and yet provide the efficiency of mechanical gearing.

A further object is to provide such a transmission which has a substantial torque multiplication range provided by three forward speed ratios, the highest of which and most used of which is a combined hydraulic and mechanical drive.

These and other objects and advantages will be apparent from the following description and accompanying drawing. The drawing shows schematically and diagrammatically a preferred embodiment of the invention. The transmission shown in the drawing, if used in a vehicle, may be mounted forward of the vehicle adjacent the engine or at the rear of the vehicle adjacent the rear axle. The transmission includes an input shaft 1 connected to drive a conventional torque converter impeller or pump wheel generally designated P and represented in the FIGURE by vane 3, in a counterclockwise direction as viewed from the left of the figure The impeller P is adapted to circulate working fluid in the direction of the arrow 4 in a closed toroidal path in known manner. The torque converter also includes a first runner or turbine wheel generally designated $R_1$ and represented in the figure by a vane 5. A second runner generally designated $R_2$ and which at times acts as a fluid reaction member and at other times as a torque transmitting turbine, is represented by vane 7. The first runner $R_1$ is connected through member 6 to a ring gear 9 of a first planetary gear set generally designated A. This gear set A also includes a plurality of planet pinions 11, only one of which is shown, that are journaled on a carrier member 13. The pinions 11 mesh with the internal teeth of the ring gear 9 and with the external teeth of a pair of spaced sun gears 17 and 18. The carrier 13 is directly connected to the transmission output shaft 15.

The sun gear 17 is connected to a sleeve shaft 19 surrounding the output shaft 15 and on which is secured a sun gear 21 of a second planetary gear set generally designated B. This second gear set B also includes a plurality of planet pinions 23 journaled on a carrier 25 and which mesh with the external teeth of the sun gear 21 and the internal teeth of a second ring gear 27 which is directly and continuously connected to the carrier 13 of the first gear set A and through carrier 13 to the output shaft 15.

The carrier 25 of the gear set B is connected by means of a one-way device 29—31 to another sleeve shaft 33. The one-way device 29—31 is shown schematically in the figure to represent a ratchet or free-wheel device wherein the inner portion 31 will allow the outer portion 29, connected to the carrier 25, to freely rotate forwardly or counterclockwise relative to 31 as viewed from the left, but will prevent rearward or clockwise rotation of the outer element 29 relative to the inner element 31 as viewed from the left. The sleeve shaft 33 is normally free to rotate in either direction, however, a forward friction device or brake 35 can be applied to prevent rotation of the shaft 33 in either direction.

A second one-way device 37—31, similar to the one-way device 29—31, prevents rearward or clockwise rotation of the second runner 7 relative to the sleeve shaft 33, but will freely allow counterclockwise rotation relative thereto. A second friction device 39 when applied, connects the sleeve shaft 33 with the sleeve shaft 19 and thereby transmits drive from the sleeve shaft 33 to the sleeve shaft 19, or alternatively, as the forward brake 35 is applied, hold the sleeve shaft 19 and connected sun gears 17 and 21 against rotation in either direction.

Still another friction device 41 can be applied to hold the first runner 5 against rotation in either direction, and through intermediate member 6 simultaneously hold the ring gear 9 against rotation. As will be seen below, the friction device 41 conditions the transmission for reverse drive. A split torque friction clutch 43 is provided to connect the input shaft 1 with the sun gear 18 of the first gear set A.

*Operation*

When the transmission is in neutral all of the friction elements 35, 39, 41 and 43 are disengaged whereby no torque reaction is provided either in the torque converter or in either of the planetary gear sets. Hence no drive can be obtained through the transmission since the sun gears 17, 18 and 21 can freely rotate. To obtain the starting or lowest speed ratio, the forward friction device 35 is applied by any suitable means, not shown, and prevents rotation in either direction of the sleeve shaft 33 and the inner one-way device member 31. Drive of the impeller P by the input shaft 1 causes oil to be circulated by its vanes 3 in the torque converter and impinge on the vanes 5 of the first runner $R_1$ to drive $R_1$ in a forward or counterclockwise direction as viewed from the left. Through the intermediate member 6, the ring gear 9 is also driven in this forward direction. With a load on the output shaft 15 resisting forward movement of the carrier 13 and hence ring gear 27 connected thereto, drive by the ring gear 9 of the pinion 11 will urge the sun gear 17 and sun gear 21 in a rearward or clockwise direction. Since the ring gear 27 is connected to the stationary loaded output shaft 15, reverse rotation of the sun gear 21 will urge the planet carrier 25 in a reverse or clockwise direction, again as viewed from the left. The one-way device 29—31 and the forward friction device 35 prevent rearward rotation of the carrier 25 so the ring gear 27 and connected carrier 13 are thereby caused to rotate in a counterclockwise or forward direction. Since the carrier 13 is connected to the output shaft 15 which is in turn connected to drive the vehicle wheels through any suitable means, not shown, the vehicle begins to move.

During this initial starting operation, oil leaving the vanes 5 of the runner $R_1$ is flowing in a reverse or clockwise direction and attempts to drive the vanes 7 of the second runner $R_2$ in reverse direction. The one-way device 37—31 and the engaged forward friction device 35 prevent such reverse rotation resulting in the vanes 7 turning the oil in a forward direction when entering the impeller 3 and thereby provide fluid torque reaction and multiplication in the torque converter in known manner. As the speed of the ring gear 9 and runner $R_1$ increases, the oil leaves the vanes 5 in a lesser and lesser rearward direction and eventually impinge on the vanes 7 to urge them and runner $R_2$ in a forward direction. Under this condition the overall torque multiplication of the transmission is a combination of that obtained in the torque converter and the compound mechanical ratio obtained through the planetary gear sets A and B. This mechanical ratio is predetermined by the teeth ratios of the gears sets and can easily be calculated.

To obtain second or intermediate speed in the transmission, the forward friction member 35 remains engaged and the friction member 39 is also engaged. The sleeve shaft 19 and the sun gears 17 and 21 are thus held by the friction members 35 and 39 against rotation in either direction. With the sun gear 17 held against rearward rotation, drive is from the turbine $R_1$ to the ring gear 9 which causes a reduced speed forward rotation of the planet carrier 13 and connected output shaft 15. The one-way device 29—31 allows carrier 25 to freely rotate in a forward or counterclockwise direction, which the forward rotation of the ring gear 27 and non-rotation of the sun gear 21 imposes on the carrier 25. The overall reduction of the transmission is then a total provided by a torque converter and the simple ratio of the planetary gear unit A determined by the teeth ratio of the gears therein.

Third speed or split torque is provided by releasing the friction member 39 and applying the split torque friction device or clutch 43. The front planetary gear unit A is then driven through two torque paths, with the torque converter impeller 3, turbine 5, intermediate member 6, and ring gear 9 forming one torque path; and the split torque clutch 43 and sun gear 18 forming a second torque path. Carrier 13 and output shaft 15 are driven in a forward or counterclockwise direction at a speed which is slightly less than engine speed due to slip in the torque converter.

Reverse drive results when friction devices 39—41 are applied. Under this condition, runner $R_1$ which acts as a turbine in forward drive is held against rotation and its vanes 5 reverse the direction of the oil from the impeller so that it acts on the vanes 7 of runner $R_2$ to urge the same rearwardly or clockwise. This clockwise drive is transmitted through the one-way device 37—31 to the sleeve shaft 33 and through friction device 39 to the sleeve shaft 19 and sun gear 17.

Since runner $R_1$ is held against rotation, the ring gear 9 is also held and thus provides torque reaction for the front gear set A. With sun gear 17 being driven reversely and ring gear 9 held, the carrier 13 and output shaft 15 are driven reversely or clockwise at a reduced speed dependent on the predetermined gear ratio of gear set A. With carrier 13 driven reversely at a speed less than that of the reverse speed of sun gear 17 then ring gear 27 also rotates reversely at a slower speed than the reverse rotation of sun gear 21. This causes the carrier 25 to rotate reversely at a speed less than that of gear 17 and shaft 33. The one-way device 29—31 allows this without any effect on the drive through the transmission.

When it is desired to obtain engine braking during forward drive vehicle coasting such as when the vehicle is going downhill the split torque clutch 43 can be disengaged and the friction device 39 applied. This condition is the same as intermediate or second speed and drive of the carrier 13 by the output shaft 15 will cause overdrive of the ring gear 9 and runner $R_1$. Runner $R_1$ will then attempt to drive the impeller P whose speed is limited by the input shaft 1 and engine speed. This braking action by overdriving the turbine is similar to that obtained in any combined torque converter and mechanical gearing transmission wherein the gearing is conditioned for positive two-way non-direct ratio drive.

It is understood that changes and modifications may be made without departing from the spirit of the invention which is limited only by the following claims.

I claim:

1. A transmission including a fluid torque converter having an impeller, a turbine and a fluid reaction member, an input shaft connected to drive said impeller, a first planetary gear set having a pair of input members, an output member and a reaction member, means connecting one of said input members to said turbine for drive thereby, a second gear set having a first member connected to said first gear set reaction member, a second member connected to said output member and a reaction member for providing geared reaction for said first gear set, releasable means for providing direct reaction for said first gear set, and releasable means connecting said input shaft with the other input member of said first gear set to provide split torque input to said first gear set.

2. A transmission including a fluid torque converter having an impeller and a pair of fluid runners, an input shaft connected to drive said impeller, a first planetary gear set having a first input member connected for drive by one of said runners, a second input member, an output member and a reaction member, a second gear set having a releasable reaction member, a first member connected to said first gear set reaction member and a second member connected to said output member, said second gear set providing geared reaction for said first gear set, releasable means for providing direct reaction for said first gear set, releasable means connecting said input shaft with said second input member to provide split torque input to said first gear set, and releasable means for holding said one runner and input member to provide reverse reaction in said converter and said first gear set.

3. A three speed transmission including a fluid torque converter having an impeller, a turbine and a fluid reaction member, an input shaft connected to drive said impeller, a first planetary gear set having a first ring gear connected to said turbine, a first sun gear and a plurality of planet pinions meshing with said sun and ring gears and journaled on a first planet carrier, an output shaft connected to said first carrier, a second planetary gear set having a second ring gear connected to said first carrier, a second sun gear connected to said first sun gear and a plurality of planet pinions meshing with said second sun and second ring gears and journaled on a second carrier; releasable means for holding said second carrier against reverse rotation to provide geared reaction for said first gear set through said first sun gear to provide a first speed drive, releasable means for holding said first sun gear to provide direct reaction for said first gear set to provide a second speed drive, said first gear set having a third sun gear meshing with its planet pinions and releasable means for connecting said third sun gear for drive by said input shaft to provide a three speed split torque drive through said transmission.

4. A transmission including a fluid torque converter having an impeller and a pair of fluid runners, an input shaft connected to drive said impeller, a first planetary gear set having a first ring gear connected to one of said runners, a first sun gear and a plurality of planet pinions meshing with said sun and ring gears and journaled on a first planet carrier, an output shaft connected to said first carrier, a second planetary gear set having a second ring gear connected to said first carrier, a second sun gear connected to said first sun gear and a plurality of planet pinions meshing with said second sun and second ring gears and journaled on a second carrier; means for releasably holding said second carrier against reverse rotation to provide geared reaction to said first sun gear, releasable means for holding said first sun gear to provide direct reaction for said first gear set, said first gear set having a third sun gear meshing with its planet pinions, releasable means for connecting said third sun gear for drive by said input shaft, releasable means for holding said one runner and ring gear to provide reaction for reverse drive through said converter and said first gear set, and releasable means for transmitting reverse drive from the other of said runners to said first sun gear.

References Cited in the file of this patent

UNITED STATES PATENTS

| | | |
|---|---|---|
| 2,768,537 | Seybold | Oct. 30, 1956 |
| 2,968,197 | De Lorean | Jan. 17, 1961 |